United States Patent [19]

van der Ent

[11] Patent Number: 5,081,823
[45] Date of Patent: Jan. 21, 1992

[54] MULTIPLE ARTICLE STACKING AND PACKAGING APPARATUS

[76] Inventor: Hans van der Ent, 809 Farr Pl., Reading, Pa. 19611

[21] Appl. No.: 556,761

[22] Filed: Jul. 23, 1990

[51] Int. Cl.$^5$ .............................................. B65B 35/50
[52] U.S. Cl. ........................................ 53/501; 53/535; 53/542; 53/540
[58] Field of Search ................. 53/152, 153, 243, 245, 53/501, 529, 535, 540, 542; 198/419.3; 414/790.4

[56] References Cited

U.S. PATENT DOCUMENTS

| | | | |
|---|---|---|---|
| 2,656,656 | 10/1953 | Murdoch et al. | 53/529 X |
| 3,019,886 | 2/1962 | Winkler et al. | 414/790.4 X |
| 3,589,094 | 6/1971 | Pearson | 53/243 X |
| 3,766,706 | 10/1973 | Graham | 53/529 |
| 4,054,015 | 10/1977 | Rowell | 53/540 X |
| 4,074,508 | 2/1978 | Reid | 53/542 X |
| 4,824,307 | 4/1989 | Johnson et al. | 414/790.4 X |

FOREIGN PATENT DOCUMENTS 2607798  6/1988  France .................. 414/790.4

Primary Examiner—Robert L. Spruill
Assistant Examiner—Daniel B. Moon
Attorney, Agent, or Firm—Seidel, Gonda, Lavorgna & Monaco

[57] ABSTRACT

A device for stacking and packaging a series of articles includes a rotating wheel having a multiple number of dividers thereon. The dividers being selectably projected from the periphery of the wheel in various space relationships for defining the size of a stack. The size of the stack is adjusted by varying the distance between adjacent dividers. The stacking wheel moves a stack to a packaging device that includes elements to align the stack for positioning into a package.

13 Claims, 3 Drawing Sheets

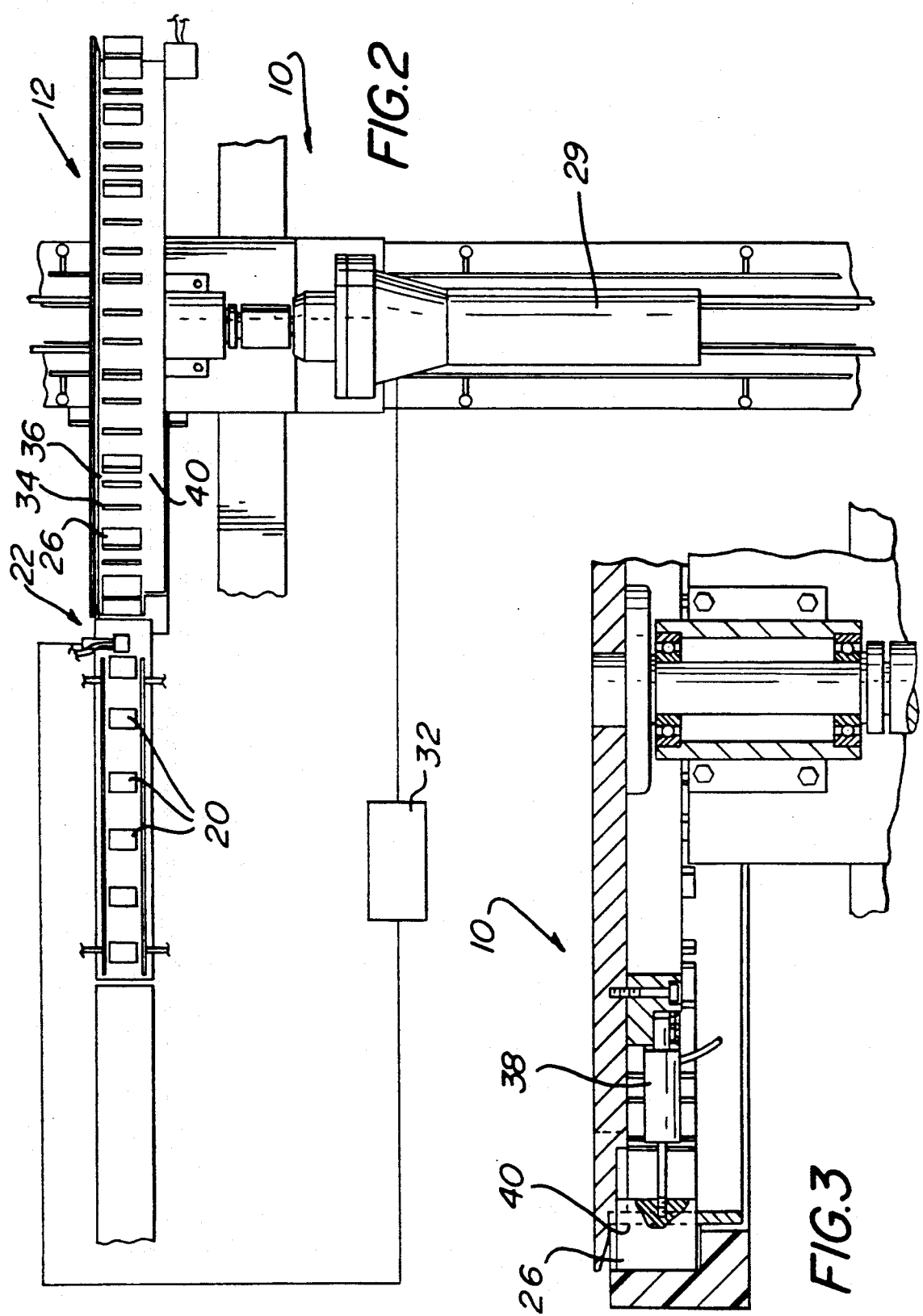

MULTIPLE ARTICLE STACKING AND PACKAGING APPARATUS

BACKGROUND OF THE INVENTION

The present invention relates to a device for receiving a series of individual articles, placing those articles in a stack, and packaging the stack in a tray or container on a continuous basis. The device is further contemplated to be capable of varying the size of the stack.

SUMMARY OF THE INVENTION

The present invention relates to a device for stacking a series of articles, such as cookies, and packaging the stack in a tray or container. The invention is specifically contemplated to be capable of varying the size of the stack, as desired.

The contemplated invention is positioned at the end of a conveyer which consecutively feeds articles towards a stacking area. Within the stacking area is provided a stacking wheel which includes a series of dividers that project radially outwardly from the circumference thereof. As the articles move along the feed conveyer, they pass underneath a counter. The counter upon passage of each article, sends a signal to a drive motor that causes an incremental rotation of the stacking wheel. As each article is moved off of the conveyer belt, it is positioned on the top of the stack formed on one of the dividers. The incremental rotation of the wheel places the top of the stack in its proper position for receipt of the next article. The dividers are spaced equally from one another on the periphery of the stacking wheel such that a constant number of articles are provided within each stack. The stack, upon completion is moved to a packing area at the bottom of the wheel rotation.

Adjusting the size of the stack is accomplished by varying the spacing between the dividers projected from the stacking wheel. In a preferred embodiment, the stacking wheel is provided with a plurality of dividers located around the circumference having an equivalent spacing therebetween. Adjustment is accomplished by projecting only a preset group of dividers. The projection of the group is controlled by air actuated cylinders, magnetic means or the like. A multiple number of preset arrangements of dividers is contemplated in order to provide a multiple number of stacking relationships. The selection of one group of dividers, corresponding to the size of the stack, may be programmed along with an incremental adjustment of the drive motor for the stacking wheel.

Another feature contemplated by the present invention is a means for placing the stack of articles into its packaging. Upon rotation of the stack of articles to the bottom of the stacking wheel, the stack has been shifted approximately 90° in orientation. A first sliding plate moves out from under the stack and the stack falls into a retaining area. Upon passage of the stack into the retaining area, squeezing elements move slightly together to compress the stack and to realign the individual articles therein. Thereafter, a second sliding plate is moved out from under the retaining area and the articles fall into a container positioned therebelow.

It is contemplated that the stacking and packaging device will operate continuously. If it is desired to change the type or size of the articles being fed into the stacking area or if it is desired to change the size of the stack, the stacking wheel and packaging device may be adjusted to define the desired stack size and package orientation.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 shows a top plan view of the apparatus shown in FIG. 1.

FIG. 3 shows a cross-sectional view of the apparatus as taken along line 3—3 in FIG. 1.

DETAILED DESCRIPTION OF THE INVENTION

Figure 1:
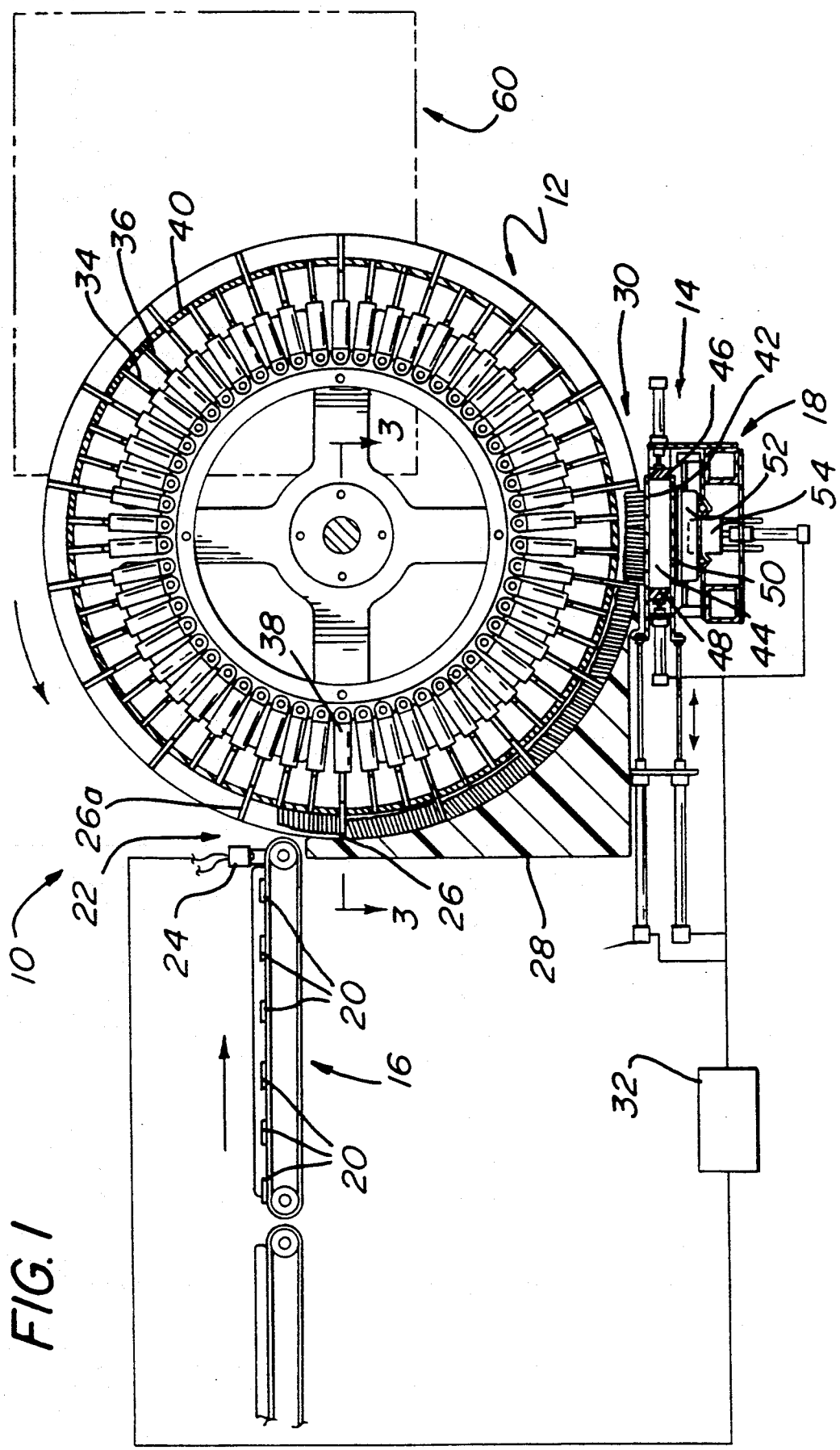
FIG. 1 shows a cross-sectional view of an apparatus in accordance with the present invention.

In the figures where like numerals indicate like elements, there is shown a stacking and packaging apparatus as generally designated by the numeral 10. The apparatus 10, as generally illustrated in FIG. 1, comprises a stacking wheel portion 12 and a packaging portion 14. Operating in conjunction with the stacking wheel 12 and the package device 14 is a feed conveyer 16 and an exhaust conveyer 18. The feed conveyer 16 generally supplies a series of articles in succession towards the stacking wheel 12. The feed conveyer represents the output of a continuous production device (not shown) for articles 20, such as cookies. Positioned at the end of the feed conveyer 16 is the stacking area 22. The stacking area 22 generally comprises the end of feed conveyer 16, an electronic counter 24, and an extending projection or divider 26 located on the stacking wheel 12.

As the articles 20, positioned in a space relationship along the feed conveyer, are moved towards the stacking area 22, each passes under the counter 24. The counter 24 may be an optical type sensor which reacts to the presence of an article on the surface of a, preferably white, conveyor belt. The passage of an article 20 under the counter 24 causes a signal to be sent to a control means 32. The control means 32 in turn sends a signal to a drive motor 29, illustrated in FIG. 2. The drive motor 29 is contemplated to be a servo type motor which causes precise incremental rotation of the stacking wheel 12 in a counterclockwise direction (as seen in FIG. 1). The article 20 is then passed off of the end of the conveyor 16 and onto the divider 26 or, if articles have already been stacked thereon, onto the top of the stack resting on the divider 26. It is contemplated that the feed conveyer 16 will operate at such a rate that the articles 20 will move onto the stacking wheel without causing any substantial misalignment. A separate retaining and/or supporting means (not shown) may also be provided so as to maintain the stack in the proper alignment along the stacking wheel and on the top of divider 26. Means may also be provided adjacent the stacking wheel for continuously cleaning the stacking wheel 12 as in area 60 in FIG. 1.

The size of the stack formed by the stacking wheel 12 is determined by the distance between one divider 26 and its next adjacent divider 26a. Thus when the number of articles 20 in the stack depletes the spacing between adjacent dividers 26 and 26a, the incremental rotation is such that the new stack is started on divider 26a. As the stacking wheel 12 continues to incrementally rotate, a support guide 28 maintains the stack on the stacking wheel 12 and between the adjacent dividers 26, 26a. The wheel 12 rotates from the stacking area 22 towards the packaging device 14 and shifts the orientation of the stack approximately 90°. Thus, when the articles 20 reach the packaging area 30 at the bottom of the stacking wheel 12, the stack is generally longitudinally oriented.

The stacking wheel 12 includes a multiple number of dividers. As illustrated, the dividers are projected at equally spaced intervals around the circumference of the wheel 12. The distance between adjacent dividers defines the size of the stack. The number of articles within the stack will depend on the spacing between adjacent dividers and the thickness of each article. Each of these parameters can be programmed into the controller 32 so as to adjust the incremental rotation of the wheel 12. Furthermore, the relative spacing between the projected dividers can be adjusted by selecting various groups of dividers. The dividers 26 shown as projected in FIG. 1 represent only a portion of the number provided on wheel 12. Retracted dividers 34 and 36 may also be projected along with dividers 26 in various formats, as desired. Thus, by selecting any series or combination of dividers 26, 34 and 36, the relative spacing between adjacent dividers on the wheel 12 is varied, and thus the size of the stack can be varied.

As illustrated in FIG. 3, projection of the dividers is accomplished by air actuated cylinders 38. The actuators 38 control whether or not the dividers 26, 34 or 36 are projected from the support surface 40 of the stacking wheel 12. Upon selection of a specific size stack, corresponding to the number of articles desired and the size of the articles to be packaged, the selection of the specific group of dividers to be projected is determined. This calculation may be performed by the controller 32 along with the calculation of the incremental rotation of the wheel 12 by the drive motor 29. Equivalent means to control the projection of the dividers from the periphery of the wheel 12 may also be utilized and is contemplated by the present invention.

Upon orientation of the stack of articles to the packaging area 30, the stack is positioned on a first sliding plate 42. Positioned below the first sliding plate 42 is a retaining area 44. The retaining area 44 is defined by squeezing elements 46 and 48 and by stationary side walls (not shown). The bottom of the retaining area is defined by a second sliding plate 50. The second sliding plate 50 is positioned directly above the exhaust conveyor 18. A package or tray 52 is retained on conveyor 18 for receiving a stack. The tray 52 may be held in position on conveyer 18 by means of projecting stop 54.

Figure 4:
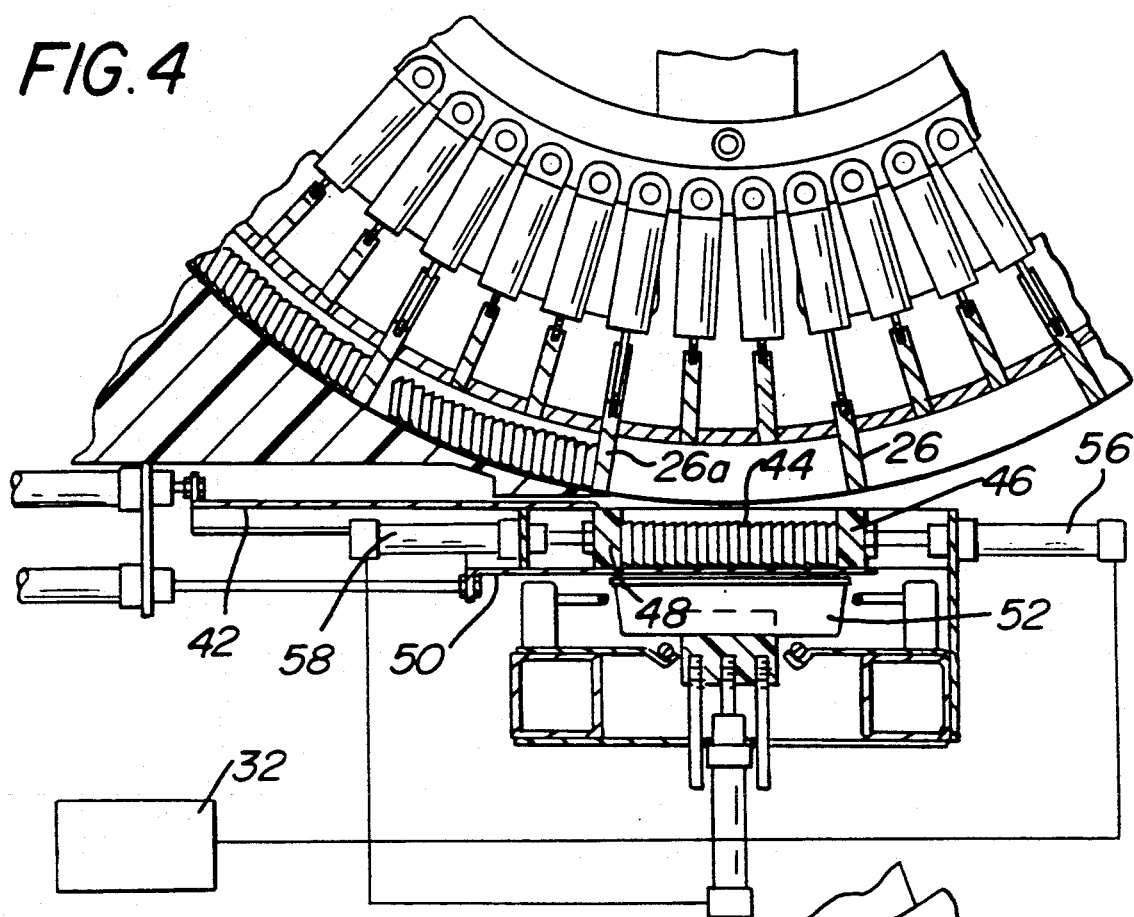
FIG. 4 shows a partial cross-sectional view of the apparatus of the present invention.

In FIG. 1, a stack of articles has reached the position of the packaging area 30 and is ready to be inserted into tray 52 by means of the packaging device 14. The initial operation of the packaging device 14 is illustrated in FIG. 4. The first sliding plate 42 has been withdrawn from underneath the stack. The articles thus move (fall) into the retaining area 44. It is contemplated that the spacing between adjacent dividers 26 and 26a is slightly larger than the space provided within the tray 52. This relative spacing permits the articles in the stack to remain somewhat loose as they rotate along the support guide 28 to the packaging area 30. However, in order to properly align the stack for placement into the tray 52, squeezing elements 46 and 48 move relatively inward to slightly compress the stack and realign the articles therein. The initial position of the squeezing elements is generally contemplated to correspond to the distance between adjacent dividers on the wheel 12. The relative position between adjacent dividers on the divider, the initial position of the squeezing elements 46 and 48, and the amount of compression during squeezing is controlled by the controller 32. Movement of the squeezing elements 46 and 48 is accomplished by actuating cylinders 56 and 58, respectively.

Figure 5:
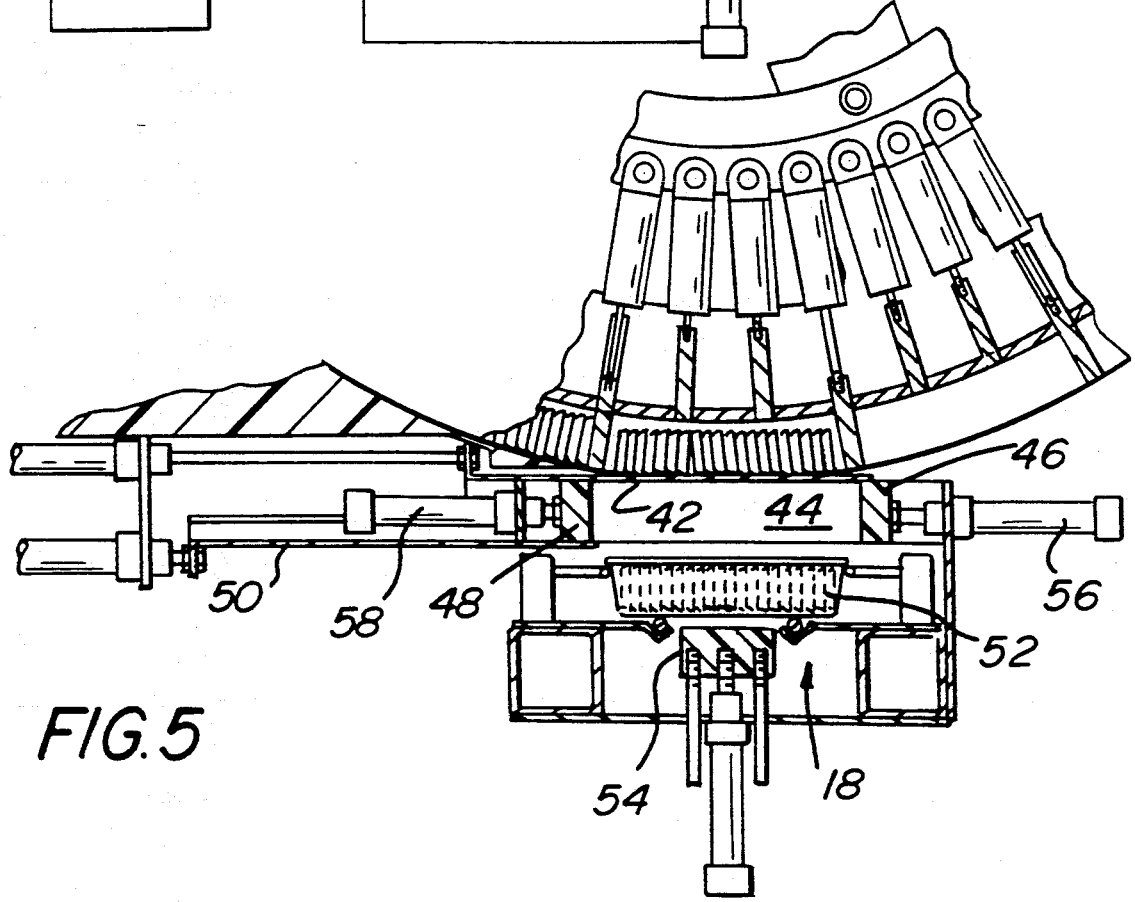
FIG. 5 shows an alternate view of the portion of the invention shown in FIG. 4.

As is illustrated in FIG. 5, upon compression of the stack between the squeezing elements 46 and 48, the second sliding plate 50 is retracted and the stack is permitted to fall into the tray 52. Substantially simultaneous with the retraction of the second sliding plate 50 is the release of the squeezing element 46 and 48. Upon the stack being positioned in the tray 52, stop 54 is withdrawn. The tray 52 is then permitted to move along the exhaust conveyer 18 to the next station in the production line.

The timing of the movement of the first sliding plate 42, the squeezing elements 46 and 48, the second sliding plate 50, and stop 54 is generally controlled by controller 32 and is a function of the size of the stack and the number of articles therein. The size of the stack is determined at the initiation of the operation by inputting the number of articles desired to be positioned within the stack and the size of each individual article.

It should be noted that the incremental movement of the stacking wheel 12 may result in a backlash at the end of the rotation thereof, due to the momentum of the stacking wheel 12. This backlash may be controlled by a brake (not shown), magnetic or otherwise, which is timed in conjunction with the incremental rotation of the wheel 12. Preferably, an anti-backlash type drive motor 29 is provided. Other means for controlling backlash are also contemplated. Furthermore, although pneumatic type actuated cylinders are contemplated for use with the moving parts of the apparatus 10, other means of actuation may also be utilized, including electronic cellanoids, mechanically controlled levers and the like.

A vibration means may be utilized within the packaging device 14 so as to assist in maintaining proper alignment of the articles by settling them within the retaining area 44 and/or the tray 52. Also, a number of stops 54 may be provided for trays having multiple slots therein for receiving multiple stacks of articles. Each stop would permit an incremental movement of the tray 52 along exhaust conveyer 18 to properly align the desired slot under the retaining area 44.

The present invention may be embodied in other specific forms without departing from the spirit or essential attributes thereof and, accordingly, reference should be made to the appended claims, rather than to the foregoing specification, as indicating the scope of the invention.

I claim:

1. An apparatus for stacking or packing a series of articles directed toward the apparatus on a continuous feed conveyor, the apparatus comprising: a stacking wheel adapted to rotate about a horizontally-positioned axis, the stacking wheel including a series of projections adapted to selectively extend from the periphery thereof such that each set of adjacent extended projections defines a stacking area therebetween for a predetermined size stack, means for varying the distance between adjacent extended projections on the periphery of the stacking wheel so as to vary the size of the stack defined thereby, means for rotating the wheel in successive increments for receipt of each article being fed, and means for receiving a stack of articles as defined by said wheel and for depositing said stack into a package.

2. An apparatus as claimed in claim 1 wherein the rotating means comprises a servo type motor.

3. An apparatus as claimed in claim 2 wherein the rotating means further comprises means for preventing backlash after completing an incremental wheel rotation.

4. An apparatus as claimed in claim 1 further comprising counter means for initiating the incremental rotation of the wheel by said rotating means, the counter means detecting the feed of each individual article toward said stacking wheel.

5. An apparatus as claimed in claim 1 further comprising means for alternately extending or retracting the series of projections from the periphery of the wheel, the distance varying means controlling the alternate extension of the individual projections in the series.

6. An apparatus as claimed in claim 5 wherein the alternate extending or retracting means comprises a series of air actuated cylinder means each attached to a corresponding projection in the series.

7. An apparatus as claimed in claim 1 wherein the distance varying means comprises means for controlling the extension of a specified number of projections from the periphery of the wheel.

8. An apparatus as claimed in claim 7 further comprising a first sliding plate, a retaining area and a second sliding plate, the first sliding plate being laterally removable from under the stack positioned between a pair of adjacent extended projections on the stacking wheel, the stack upon removal of the first sliding plate moving into the retaining area and being supported by the second sliding plate, the second sliding plate being laterally removable from under the stack in the retaining area, the stack upon removal of the second sliding plate moving into a package positioned therebelow, the retaining area defined in part by squeezing means positioned on opposite sides of the stack upon movement into the retaining area, the squeezing means positioned on opposite sides of the stack upon movement into the retaining area, the squeezing means adapted to compress the stack within the retaining area and to conform the size of the stack to that of the package position therebelow, the controlling means further adapted to define the size of the retaining area between the squeezing means and the amount of compression of the squeezing means, the size of the retaining area and the amount of compression being a function of the size of the stack and the distance between the adjacent extended projections on the stacking wheel.

9. An apparatus as claimed in claim 1 wherein the stack receiving means further comprises means to support a stack of articles positioned between adjacent extended projections on the stacking wheel, said support means being movable to deposit the stack between said adjacent extended projections into the package.

10. An apparatus as claimed in claim 1 wherein the support means comprises a first sliding plate, a retaining area and a second sliding plate, the first sliding plate being laterally removable from under the stack positioned between a pair of adjacent extended projections on the stacking wheel, the stack upon removal of the first sliding plate moving into the retaining area and being supported by the second sliding plate the second sliding plate being laterally removable from under the stack in the retaining area, the stack upon removal of the second sliding plate moving into a package positioned therebelow.

11. An apparatus as claimed in claim 10 wherein the retaining area is defined in part by squeezing means positioned on opposite sides of the stack upon movement into the retaining area, the squeezing means adapted to compress the stack within the retaining area and to conform the size of the stack to that of the package positioned therebelow.

12. An apparatus for stacking a series of articles directed on a continuous feed conveyor towards the apparatus and for packaging the stack of articles in a package positioned on an exhaust conveyor, the apparatus comprising:
a stacking wheel adapted to rotate about a horizontally positioned axis, the stacking wheel including a series of projections radially extending from the periphery thereof such that each set of adjacent extended projections defines a stacking area of equivalent size therebetween,
means for varying the distance between adjacent extended projections on the periphery of the stacking wheel so as to vary the size of each stack defined thereby,
means for rotating the wheel so as to receive and position each article on top of the stack being formed by the stacking wheel, and
means for receiving a stack of articles as defined by said wheel and for depositing said stack into the package positioned on the exhaust conveyor.

13. An apparatus for stacking a series of articles directed towards the apparatus on a continuous feed conveyor and for packaging the stack of articles in a package positioned on an exhaust conveyor, the apparatus comprising:
a stacking wheel adapted to rotate about a horizontally positioned axis, the stacking wheel including a series of projections adapted to selectively extend from the periphery of the wheel such that each set of adjacent extended projections defines a stacking area therebetween for a predetermined size stack,
means for selectably extending the projections from the periphery of the stacking wheel so as to vary the size of the stack defined thereby,
means for rotating the wheel in successive increments for receipt of each article being fed from the feed conveyor, and
means for receiving a stack of articles and for depositing said stack into a package positioned on the exhaust conveyor.

* * * * *